March 4, 1941.     H. SNOW     2,233,435
GLASS STOCK FOR ELECTRIC MELTING
Filed Feb. 26, 1938
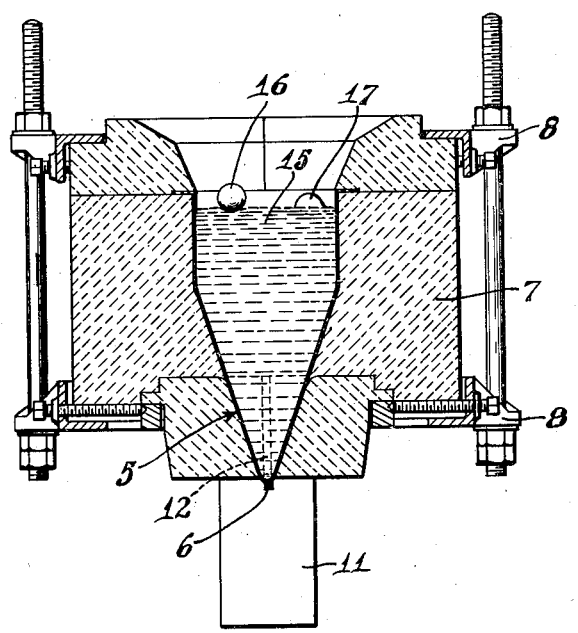
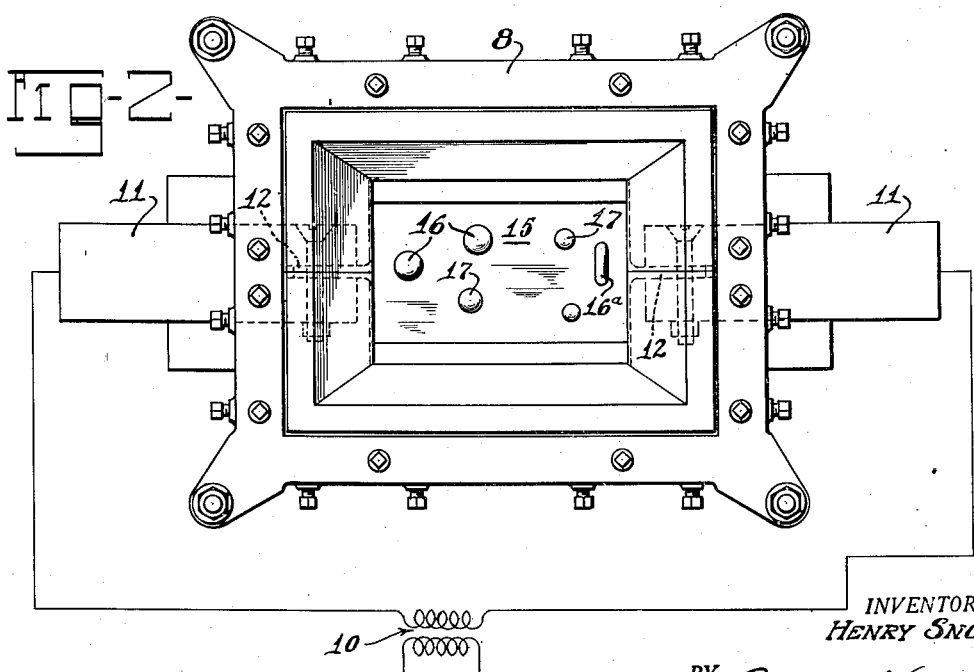
INVENTOR.
HENRY SNOW.
BY Rule & Hoge
ATTORNEYS.

Patented Mar. 4, 1941

2,233,435

UNITED STATES PATENT OFFICE 2,233,435

GLASS STOCK FOR ELECTRIC MELTING

Henry Snow, Newark, Ohio, assignor, by mesne assignments, to Owens-Corning Fiberglas Corporation, Toledo, Ohio, a corporation of Delaware Application February 26, 1938, Serial No. 192,689

4 Claims. (Cl. 49—77)

The present invention relates to a form of glass stock which may be fed into a supply body of molten glass and form a part thereof, and more particularly to a form of such glass stock which may be melted and readily pass into said body while at a relatively low temperature, or at a temperature below which fining and elimination of trapped gases may readily take place.

Among the objects of the present invention is primarily to procure seed-free glass. The uses of such glass may be manifold, but such glass is particularly desirable when producing optical glass or fibrous glass for textile purposes in small bushings or troughs which are electrically heated in order to melt the glass therein.

The temperature of such glass is relatively critical in order to produce fibrous glass of a high quality. This temperature generally is below the fining temperature of the glass, or at least is at a temperature at which fining and elimination of gas bubbles, seeds and the like is sluggish. Accordingly, if any stones, air bubbles or seeds are entrapped in this molten body, they are prevented from rising to the surface of the glass and escaping. Instead they flow downwardly with the molten body to the outlet openings where they interrupt the flow of the glass and cause discontinuities in the glass streams. Such discontinuities cause much difficulty in the operation, and lower the efficiency and quality of the finished product.

In order to provide a smooth supply body of glass free from stones and seeds, it has been found advisable to feed in refined glass cullet or glass stock.

Ordinary glass stock or cullet has been found to crizzle or crack up during the melting period owing to uneven melting conditions, and tiny bubbles and seeds are carried into the molten glass in the cracks or crizzled portions thereof. These entrained gases are difficult, if not impossible to remove. As a matter of fact, ordinary annealed glass cullet becomes so strained in the furnace during the melting period, that it may crack with violence. In order to partially overcome this condition heretofore, it has been necessary to heat the glass to high temperatures to render the glass very fluid, and then cool it to the desired forming range, but this used an excessive amount of heat and necessitated a larger melting unit.

An object of the present invention is to overcome these objections, and to provide glass stock in a form which will prevent cracking or crizzling during the heating up and melting period of the stock prior to its melting in and becoming part of the molten body.

Another object of the invention is to facilitate feeding of the glass stock into the furnace.

Still another object of the invention is to reduce the amount of heating necessary to melt the glass stock in order to form a supply body at the proper temperature and free from seeds. It is also the aim of the invention to reduce the size of the melting containers over that necessary for other types of glass stock.

Other objects and advantages of the present invention will become apparent from the following description taken in conjunction with the drawing, in which:

Fig. 1 is a cross-sectional elevational view of a melting unit as applied to an apparatus for producing fibrous glass; and Fig. 2 is a plan view of the same apparatus.

The present invention is based in part upon the discovery that tempered glass, that is glass having internal strains, and especially strains producing a surface compression, has a melting characteristic unlike other glasses, in that as it melts, it merely slumps and merges into the supply body without cracking, crizzling, or otherwise breaking up, whereby gases, seeds and bubbles are prevented from becoming entrained in the supply body. It is also possible when melting tempered or strained glass, to melt the same at a lower temperature and form the supply body at a lower temperature, in view of the fact that it is unnecessary to remelt or rework the glass at a high temperature in order to permit seeds, bubbles or the like from escaping into the atmosphere.

Another phase of the invention involves the use of rounded surfaces and especially glass balls or spheres which lend themselves admirably to the present invention. The use of glass balls or spheres facilitates the formation of uniformly tempered or strained glass. Moreover, the sizes of the spheres may be uniform and thus insure a positive amount of glass feed, regulable merely by adjusting the interval of time of feeding of the glass balls.

Another highly advantageous feature of the glass balls is that they automatically magnify any defects such as seeds or stones carried therein and thus facilitate inspection.

Glass bodies having rounded surfaces may be made from cane or pressed plates, or if spheres are used they may be fabricated on ordinary marble machines. The sizes of the glass bodies may vary considerably ranging from shot-like particles to large bodies, although it has been found that for ordinary textile bushings sizes of about ¼ to 1 inch in diameter are satisfactory.

Referring now more particularly to the drawing, reference character 5 designates a melting crucible, preferably of metal such as platinum or the like, although other metals of Nichrome, iron or the like may also be used. If desired, an ordinary clay crucible, forehearth, tank or the like may also be used.

The crucible 5 is provided at the lower end thereof with a series of outlet orifices 6 adapted to emit glass for any desired purpose. The crucible is held in a suitable refractory support 7 which may be held by the framework 8. The metal crucible or container 5 is preferably electrically heated, as by a transformer 10 or other suitable source of electrical energy. The transformer is electrically connected through the terminals 11 to lugs 12 integral with and on each side of the container 5.

The crucible 5 contains a body 15 of molten glass, which is replenished and regulated by glass stock 16, produced in accordance with the present invention. As shown in the drawing, the glass stock 16 is in the form of spheres which are fed to the top of the molten body 15 where they are gradually heated by the molten body and gradually slump, melt and form part of the body. Reference character 16a designates a body of glass stock having rounded surfaces and which may be made from cane, or pressed plate or the like and suitably provided with internal strains. The glass stock article 17 is shown partially melted into the supply body 15. It will be noted that during the melting these particles do not crack and entrain gaseous bubbles or the like which would be very slow in being removed at the relatively low temperature at which the glass is being melted.

Thus, the use of tempered glass balls permits the glass to be melted at temperatures below which fining and removal of gas, bubbles or the like is readily and practicably accomplished. Other shapes of tempered glass bodies having rounded surfaces, such as cylinders, produced from cane or the like may also be used.

Various modifications and variations may be resorted to within the spirit and scope of the present invention as defined in the appended claims.

I claim:

1. The method of maintaining for the production of fibrous glass a body of molten glass at a viscosity at which the removal of bubbles and seeds and the melting and fusing into a homogeneous body is sluggish which comprises feeding into said body seed-free glass stock in a vitrified state and in the form of spheres having compression strains in the periphery thereof.

2. The method of maintaining for the production of fibrous glass a body of molten glass and maintaining the same at a viscosity at which the removal of bubbles and seeds and the melting and fusing into a homogeneous body is sluggish, which comprises feeding into said body seed-free glass stock bodies in a vitrified state of highly tempered internally strained glass having rounded surfaces and substantially no sharp edges or cracks.

3. In the method of producing fibrous glass, the steps of establishing a molten supply body of glass at a temperature at which removal of seeds and gaseous bubbles is sluggish, discharging streams of glass continually from said supply body for attenuating them into fibers, and replenishing said supply body by feeding into said supply body glass stock of internally strained glass spheres.

4. The method of melting glass for use in forming filaments which comprises forming glass into substantially spherical shapes and imparting strains therein, feeding said shapes into a furnace and melting said shapes in the furnace.

HENRY SNOW.